US009327546B2

(12) United States Patent
Ikeda et al.

(10) Patent No.: US 9,327,546 B2
(45) Date of Patent: May 3, 2016

(54) MATTING ACTIVATOR FOR HYDRAULIC TRANSFER FILM, HYDRAULIC TRANSFER METHOD, AND HYDRAULIC TRANSFER PRODUCT

(75) Inventors: Wataru Ikeda, Tokyo (JP); Akiko Tomiki, Tokyo (JP)

(73) Assignee: TAICA CORPORATION, Tokyo (JP)

( * ) Notice: Subject to any disclaimer, the term of this patent is extended or adjusted under 35 U.S.C. 154(b) by 691 days.

(21) Appl. No.: 13/580,360

(22) PCT Filed: Feb. 21, 2011

(86) PCT No.: PCT/JP2011/053671
§ 371 (c)(1), (2), (4) Date: Aug. 21, 2012

(87) PCT Pub. No.: WO2011/102509
PCT Pub. Date: Aug. 25, 2011

(65) Prior Publication Data
US 2012/0321862 A1 Dec. 20, 2012

(30) Foreign Application Priority Data
Feb. 22, 2010 (JP) ................................ 2010-036277

(51) Int. Cl.
*B32B 3/10* (2006.01)
*B44C 1/175* (2006.01)

(52) U.S. Cl.
CPC ......... *B44C 1/175* (2013.01); *Y10T 428/24802* (2015.01)

(58) Field of Classification Search
None
See application file for complete search history.

(56) References Cited

U.S. PATENT DOCUMENTS

| | | | | |
|---|---|---|---|---|
| 2006/0079605 | A1* | 4/2006 | Sato et al. | 523/176 |
| 2007/0051458 | A1 | 3/2007 | Ikeda et al. | |
| 2007/0154685 | A1* | 7/2007 | Ikeda et al. | 428/195.1 |
| 2008/0199664 | A1* | 8/2008 | Otaki et al. | 428/195.1 |

FOREIGN PATENT DOCUMENTS

| | | | |
|---|---|---|---|
| JP | 2005-014604 | A | 1/2005 |
| JP | 2005-125776 | A | 5/2005 |
| JP | 2008-201918 | A | 9/2008 |
| JP | 2009-101657 | A | 5/2009 |
| WO | 2004/108434 | A1 | 12/2004 |
| WO | 2005/077676 | A1 | 8/2005 |
| WO | 2007/023577 | A1 | 3/2007 |

* cited by examiner

*Primary Examiner* — Bruce H Hess
*Assistant Examiner* — Christopher Polley
(74) *Attorney, Agent, or Firm* — Pearne & Gordon LLP

(57) ABSTRACT

There is provided a matting activator for water pressure transfer film adapted to impart the maximum matting effect to a decoration obtained by water pressure transfer with a matting agent added to the activator. To an ultraviolet ray hardening resin composite, the main component of the activator are added a matting agent and a resin bead gathering agent. The ultraviolet ray hardening resin composite includes a photo-polymerization monomer including a photo-polymerization component having at least photo-polymerization monomer and a photo-polymerization initiator, the matting agent comprises resin beads, the resin bead gathering agent comprises particulate silica, the weight ratio of the blend of the resin beads relative to the ultraviolet ray hardening resin composite is 0.01-0.3 and the weight ratio of blend of the resin bead gathering agent relative to the resin beads is adjusted in 0.05-1.5 according to the weight ratio of blend of the resin bead.

16 Claims, 7 Drawing Sheets

| | Each Size of STAR BACK Pattern |
|---|---|
| A Sction | 400 micrometers |
| B Section | 600 micrometers |
| C Section | 470 micrometers |
| D Section | 590 micrometers |

MATTING ACTIVATOR FOR HYDRAULIC TRANSFER FILM, HYDRAULIC TRANSFER METHOD, AND HYDRAULIC TRANSFER PRODUCT

TECHNICAL FIELD

This invention relates to a matting activator for water pressure transfer film and more particularly to an improvement on an activator for a water pressure transfer film adapted to be applied to a dried print pattern before water pressure transfer in order to reproduce (recover) an adhesion of the dried print pattern of the water pressure transfer film to be transferred under water pressure on a surface of an article which should be decorated whereby a matting effect can be imparted to a decoration layer formed by the water pressure transfer of the print pattern.

BACKGROUND OF TECHNOLOGY

In order to decorate the surface of the article which has the complicated three-dimensional surface, there has been used a water pressure transfer method in which the water pressure transfer film which has a print pattern of non-water solubility on a water-soluble film is floated on the water surface in a transfer tub while the water soluble film of the water pressure transfer film is made wet by water, an article (an object to be pattern-transferred) is immersed underwater within the transfer tab while contacting the print pattern of the water pressure transfer film and the print pattern of the water pressure transfer film is transferred to the surface of the article using the water pressure generated against the surface of the article on the immersion of the article to thereby form a decoration layer.

In order to impart a matting effect to the decoration layer, a matting agent such as resin beads or particulate silica has been used and the matting agent is added to and distributed by a topcoat layer generally applied on the decoration layer transferred and formed on the article (Patent Document 1).

On the other hand, the applicant has already proposed the invention in which a decoration layer is formed by a water pressure transfer while an abrasion resistance, solvent resistance, etc. imparted to the decoration layer itself without applying a topcoat layer on the decoration layer (see Patent Documents 2 through 6). In these methods, since the water pressure transfer is performed in the state where by applying an ultraviolet ray hardening resin composite containing a non-solvent type activating component such as photo-polymerization monomer to a dried print pattern of a water pressure transfer film in order to reproduce an adhesion to the dried print pattern of the water pressure transfer film, the adhesion of the print pattern is reproduced by the activating component of this ultraviolet ray hardening resin composite and the ultraviolet ray hardening resin composite permeates the whole print pattern. Thus, as the ultraviolet ray hardening resin composite within the print pattern is hardened by ultraviolet ray irradiation, there is a state where the ultraviolet ray hardening characteristic is imparted also to the decoration layer formed by the print pattern and therefore, chemical and mechanical surface protection functions such as solvent resistance and abrasion resistance are given to the decoration layer itself. In this water pressure transfer method, in order to provide the matting effect by addition of the matting agent, the matting agent is added to the activator comprising the ultraviolet ray hardening resin composite for activating the water pressure transfer film (Patent Documents 3 through 6).

(Part 1 of the Matting Appearance Mechanism by the Matting Agent)

The matting action by the matting agent appears by scattering lights due to fine unevenness on the surface of the topcoat layer formed on the decoration layer, which unevenness is caused by the matting agent existing near the surface of the topcoat layer. Therefore, in case where the matting agent is distributed in the topcoat layer TC as shown in FIG. 5, since the topcoat layer TC is the outermost surface of the portion of the article where it is decorated by the water pressure transfer, the matting action by the matting agent can appear comparatively easily on the surface of the topcoat layer. In FIG. 5, a reference numeral 10 designates the article and a reference numeral 44 designates the decoration layer.

(Part 2 of the Matting Appearance Mechanism by the Matting Agent)

On the other hand, in the method of adding a matting agent to the activator of such as ultraviolet ray hardening resin composite as disclosed in Patent Documents 2 through 6 and distributing within the decoration layer, as the activator permeates the print pattern and is hardened by ultraviolet ray within the decoration layer after the water pressure transfer, a surface protection function is imparted to the decoration layer itself and therefore the steps of the operation can be simplified because the topcoat layer becomes unnecessary. However, the matting agent MA (see FIG. 6) is unevenly located near the activator applied surface (transfer face side) of the transfer film before transfer and on the other hand, the fluid component of the activator permeates the ink layer of the print pattern and therefore the matting agent MA exists between the substrate which is the article and the decoration layer 44 after transfer, which causes the degree of formation of fine unevenness of the decoration layer 44 by the matting agent to get smaller (in comparison with FIG. 5). Thus, if the addition of the matting agent has the same condition, the method using the ultraviolet ray hardening resin composite having the matting agent added thereto without the topcoat layer must lower the matting effect in comparison with the method of adding the matting agent to the topcoat layer. If more matting agent is added in order to avoid this, then the viscosity of the activator would become higher and therefore, if would become difficult to apply the activator to the water pressure transfer film and accordingly the activator would become difficult to permeate the print pattern of the water pressure transfer film. Thus, the activation function and the surface protection function are lowered and even if the activation function and the surface protection function were obtained by some degree, the close adhesion between the substrate of the article and the decoration layer 44 is disadvantageously lowered. In the invention in which an unevenness is formed on the surface of the decoration layer by the activator of the ultraviolet ray hardening resin composite to provide a finger touch feeling, there occurs a problem in which as the matting agent in the activator increases, it becomes difficult to produce the surface unevenness and cannot obtain a predetermined finger touch feeling. Thus, sufficient matting effect with the quality of the pattern-transferred article maintained cannot be obtained only by using the conventional technology of adding the matting agent to the topcoat layer.

PRIOR ART LITERATURE

Patent Documents

Patent Documents 1 JP2005-125776A

Patent Documents 2 WO 2004/108434

Patent Documents 3 JP2005-14604A

Patent Documents 4 WO2005-77676
Patent Documents 5 WO2007/023577
Patent Documents 6 JP2009-101657A

SUMMARY OF THE INVENTION

Problems to be Solved by the Invention

First problem to be solved by the invention is to provide a matting activator for water pressure transfer film adapted to impart the maximum matting effect by a little amount of a matting agent to a decoration layer obtained by water pressure transfer using an ultraviolet ray hardening type activator having the matting agent added thereto.

Second problem to be solved by the invention is to provide a water pressure transfer method adapted to impart the maximum matting effect by a little amount of a matting agent to a decoration layer obtained by water pressure transfer using an ultraviolet ray hardening type activator having the matting agent added thereto.

Third problem to be solved by the invention is to provide a water pressure transfer article adapted to impart the maximum matting effect by a little amount of a matting agent to a decoration layer obtained by water pressure transfer using an ultraviolet ray hardening type activator having the matting agent added thereto.

Means to Solve the Problems

The inventors have come to their knowledge that as a result of various earnest considerations in order to solve the aforementioned problems, when there should be used a matting agent comprising resin beads (resinous particulates), a matting effect can be improved without any increase in addition of resin beads by disposing between a decoration layer and a pattern-transferred object a matting agent in the form of bead group (referred to as "bead lump" later) formed by massively gathering a plural of resin beads into lump and the invention has been completed based on such knowledge.

First means to be solved by the invention is to provide a matting activator comprising an ultraviolet ray hardening resin composite to be applied to a dried print pattern of a water pressure transfer film when said print pattern of said water pressure transfer film having said print pattern dried on a water soluble film is transferred on a surface of an article under water pressure, said ultraviolet ray hardening resin composite including a photo-polymerization component having at least photo-polymerization monomer and a photo-polymerization initiator, serving to reproduce an adhesion of said print pattern by a non-solvent type activating component in said ultraviolet ray hardening resin composite and permeated and intermingled with a whole portion of said print pattern and having a matting agent added to said ultraviolet ray hardening resin composite, characterized in that said matting agent includes resin beads (plurality), said activator has a resin bead gathering agent added in addition to said matting agent to act on said resin beads of said matting agent to massively gather every ones of said resin beads to a lump, a weight ratio of blend of said resin beads of said matting agent relative to said ultraviolet ray hardening resin composite (a weight ratio of blend of resin beads) is 0.01 to 0.3 and a weight ratio of blend of said resin bead gathering agent relative to said resin beads is adjusted within a range of 0.05 to 1.5 in accordance with the weight ratio of blend of resin beads.

Second means to be solved by the invention is to provide a water pressure transfer method in which a matting activator comprising an ultraviolet ray hardening resin composite is applied to a dried print pattern of a water pressure transfer film when said print pattern of said water pressure transfer film having said print pattern dried on a water soluble film is transferred on a surface of an article under water pressure, said ultraviolet ray hardening resin composite including a photo-polymerization component having at least photo-polymerization monomer and a photo-polymerization initiator, serving to reproduce an adhesion of said print pattern by a non-solvent type activating component in said ultraviolet ray hardening resin composite and permeated and intermingled with a whole portion of said print pattern and having a matting agent added to said ultraviolet ray hardening resin composite and thereafter said print pattern of said transfer film being transferred under water pressure to said surface of article, characterized in that said matting agent includes resin beads (plurality) and said activator has a resin bead gathering agent added in addition to said matting agent to act on said resin beads of said matting agent to massively gather every ones of said resin beads to a lump, a weight ratio of blend of said resin beads of said matting agent relative to said ultraviolet ray hardening resin composite (a weight ratio of blend of resin beads) is 0.01 to 0.3 and a weight ratio of blend of said resin bead gathering agent relative to said resin beads is adjusted within a range of 0.05 to 1.5 in accordance with the weight ratio of blend of resin beads.

Third means to be solved by the invention is to provide a water pressure transfer article characterized by being formed by a method of according to said second means to be solved by the invention and having a decoration layer which has a degree of glossiness of less than 55 measured based on Japanese Industrial Standards Z8741-1997 "method 3-60 degree specular surface gloss".

In the first and second means to be solved by the invention, said resin beads may be preferably one or combination of more than two of PE (polyethylene) beads, urethane beads and silicone beads and a diameter of said beads may be preferably 5-20 micrometers.

In the first and second means to be solved by the invention, said bead gathering agent may be preferably thixotropic agent and more preferably particulate silica. What is meant by the aforementioned thixotropic agent is an additive agent having the action of appearing thixotropy in rheology of the activator, which agent is one of the components of the activator of the invention.

This particulate silica is hydrophobic silica and its particle diameter may be preferably 0.005-10 micrometers. Especially, the hydrophobic silica may desirably take a silane or silazane surface treatment.

In the specification, what is meant by "resin gathering agent" is a component adapted to act on the resin beads of the matting agent in the activator to massively gather a plurality of resin beads to form many bead lumps and to serve to easily dispose these bead, lumps between the decoration layer and the object to be pattern-transferred when water pressure transfer is performed. This "resin bead gathering agent" cooperates with the resin beads of the matting agent to contribute to improvement in the matting effect in comparison with resin beads alone, but the details thereof will be explained later.

Effect of the Invention

According to the invention, both of the resin beads and the resin bead gathering agent such as particulate silica of the matting agent are used, the resin bead gathering agent impart thixotropy to the activator and the resin beads are massively gathered to form many bead lamps. Thus, big fine unevenness is formed on the surface of the decoration layer and therefore, even if the amount of addition of the resin bead is less, a higher matting effect can be imparted to the decoration layer and also the application and the permeation of the activator can be improved whereby good membranous characteristics (surface protection function and closer adhesion) of the decoration layer can be maintained.

Since the dispersibility of the matting agent in the decoration layer is improved, the good matting effect can be imparted not only to black ink, but also blue, red, and yellow inks and therefore an original matting design can be realized.

MODE OF EMBODIMENT OF INVENTION

Figure 1:
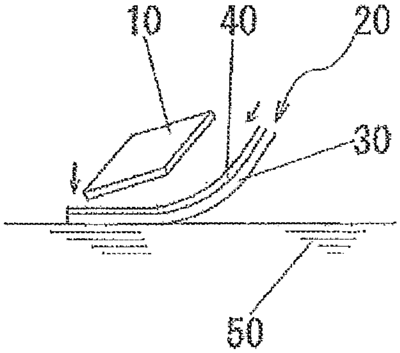
FIG. 1 is a schematic diagram of a water pressure transfer carried out with a matting activator of the invention used.

Describing a form of embodiment of the invention in detail with reference to drawings. FIG. 1 briefly shows a general water pressure transfer method to which the invention is applied. This water pressure transfer method is one in which a transfer film 20 comprising a water soluble film (carrier film) 30 having a print pattern 40 applied thereto is supplied to and floated on water 50 in a transfer tub with the print pattern directed upwardly and an article 10 to be pattern-transferred under water pressure is forced through the transfer film 20 into water 50.

The water soluble film 30 may be formed of water soluble material having a main component of polyvinyl alcohol, for example to absorb water to make it wet and soften it. The water-soluble film 30 is softened when contacting the water 50 in the transfer tub on water pressure transfer and attached around an article to be decorated, so as to carry out the water pressure transfer. In case of the general water pressure transfer, the print pattern 40 is previously applied by gravure printing etc. on the water-soluble film 30 and is in the form where it is completely dried and the adhesion thereof is lost in order to store the transfer film in the state of roll wound. It should be noted that the print pattern 40 also includes a plain (non-pattern) print layer other than the “pattern” originally meant.

Figure 2:
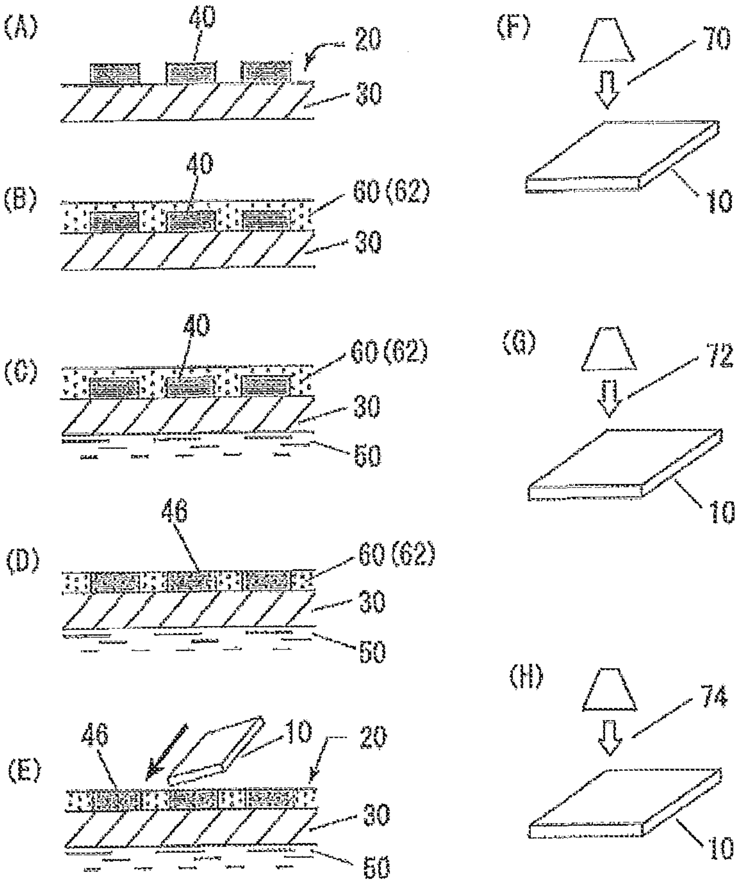
FIG. 2 schematically illustrates in (A) through (H) each step of a method for performing water pressure transfer using the matting activator of the invention.

As shown in FIG. 2, the water pressure transfer method to which the invention is applied is one in which before the water pressure transfer is performed (see FIG. 2A), an activator 60 containing an ultraviolet ray hardening resin composite 62 is applied to the print pattern 40 of the transfer film 20 (see FIG. 2B), a non-solvent type activating component in the ultraviolet ray hardening resin composite reproduces an adhesion of the print pattern 40 and the activator permeates the whole print pattern 40 (total area and total thickness) whereby the activator 60 (ultraviolet ray hardening resin composite 82 is intermingled with the print pattern 40 (see FIG. 2C). In this manner, the ink composite of the print pattern 40 and the ultraviolet ray hardening resin composite 62 applied to the print pattern 40 and permeating the print pattern 40 are mixed with each other whereby both of them are unified with each other to form the ultraviolet ray hardening resin composite mixed print pattern 48 (see FIG. 2D).

After the transfer film 20 having its adhesion reproduced by the ultraviolet ray hardening resin composite 62 and having the ultraviolet ray hardening resin composite mixed print pattern 46 formed by the ultraviolet ray hardening resin composite 62 intermingled with the whole print pattern 40 (total area and total thickness) is transferred to the article 10 under water pressure (see FIG. 2E), an ultraviolet ray is irradiated on the article (see FIG. 2F) whereby the ultraviolet ray hardening resin composite in the ultraviolet ray hardening resin composite mixed print pattern 46 is hardened maintaining integrality with the print pattern. Thus, this is exactly equivalent to the ultraviolet ray hardening characteristic imparted to the print pattern 40 itself. Therefore, the decoration layer (see FIG. 3) formed by transfer of the ultraviolet ray hardening resin composite mixed print pattern 62 itself has a surface protection function by the ultraviolet ray hardening resin composite distributed and hardened by ultraviolet ray.

Irradiation of the ultraviolet ray 70 in FIG. 2F may be preferably carried out while the water-soluble film 30 of the water pressure transfer film 20 is being wound, around the article 10 having the ultraviolet ray hardening resin composite mixed print pattern 46 transferred thereto. Therefore, although not illustrated, the step of irradiation of the ultraviolet ray may be preferably performed while the article is still underwater or after the article is removed out of water and before water washing step for removal of the water soluble film is performed. The ultraviolet ray 70 can be irradiated by using a publicly known ultraviolet ray hardening device containing a light source such as a high pressure mercury lamp, a metal halide lamp, etc. and an irradiation device (lamp house).

Figure 3:
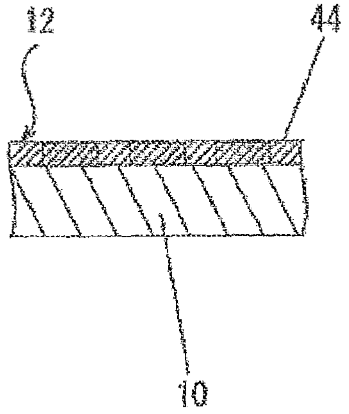
FIG. 3 is an enlarged cross sectional view of an article having a matting decoration layer obtained by the method of FIG. 2.

Thereafter as shown in FIG. 2G, the article 10 is washed by a shower 72 etc., to remove the water-soluble film (film layer swelling and dissolved) covering the upper surface of the decoration layer 44 formed on the article 10 and further as shown in FIG. 2 (H), the surface of the article is dried by hot wind 74 to complete the decorated article 12 having the decoration layer 44 formed by water pressure transfer (see FIG. 3).

Figure 8:
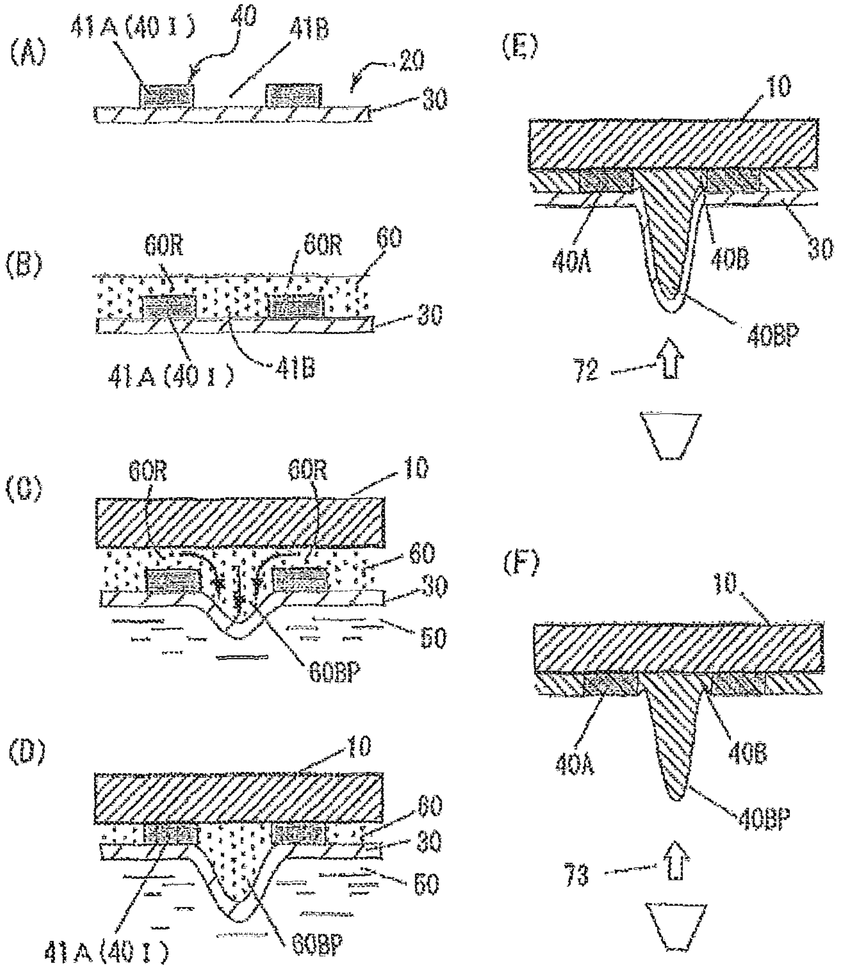
FIG. 8 schematically illustrates the sequential steps of the water pressure transfer method for forming the design of finger touch feeling in (A) through (F)
Figure 9:
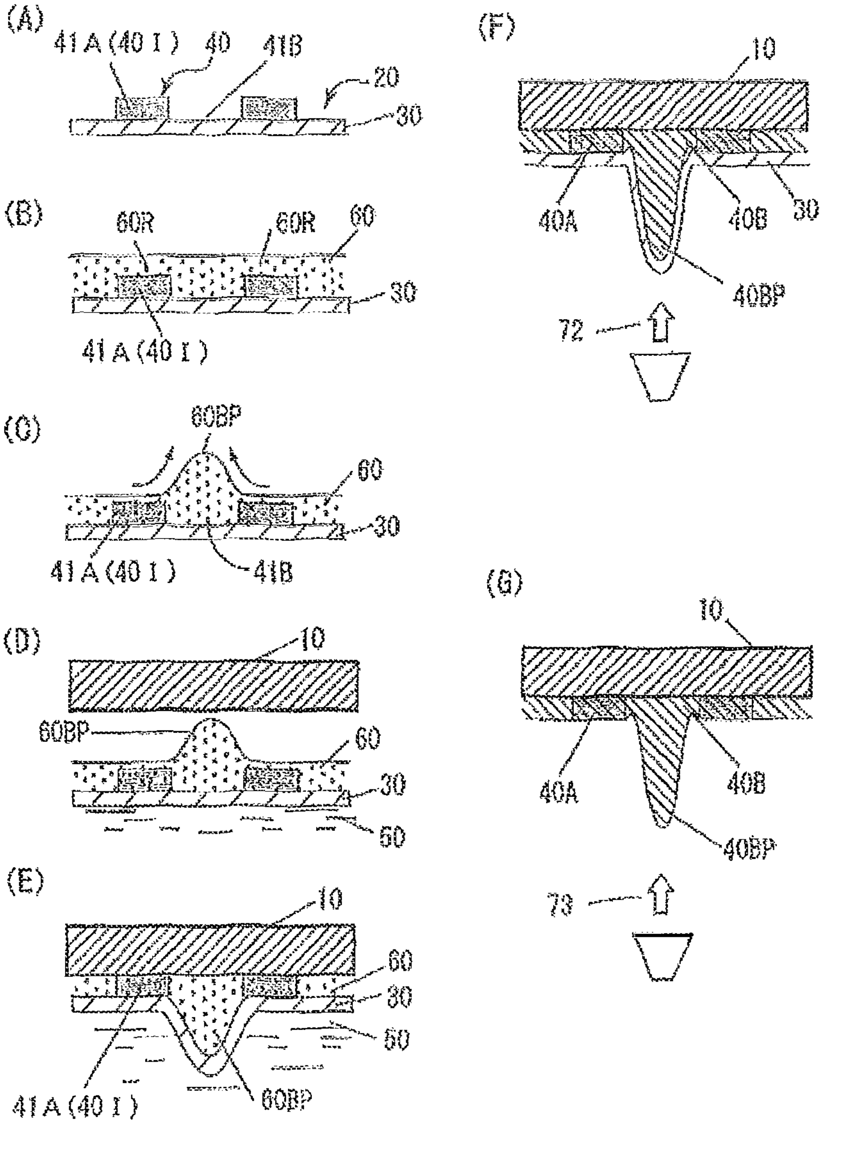
FIG. 9 schematically illustrates the water pressure transfer method for forming the design of finger touch feeling in another form in (A) through (G)

The invention is applicable also to a water pressure transfer method for forming a line convex portion on the decoration layer to produce a design of finger touch feeling (referred to as a concavo-convex design hereinafter) as disclosed in Patent Document 6. Briefly describing the general steps of the method, as shown in FIG. 8(A) and FIG. 9(A), the print pattern 40 comprises a first area 41A having an ink layer 40I and a second area 41B having no ink layer or an ink layer thinner than that of the first area 41A. There is prepared the transfer film 20 having space necessary for collecting a surplus portion of the activator in the second area 41B and having no whole surface pattern fixture layer on the print pattern 40. As shown in FIG. 8(B) and FIG. 9(B), as the activator 80 is applied on the transfer film 20, this activator 60 activates the ink layer 40I in the first area 40A of the print pattern 40 while it permeates the ink layer 40I to restore the adhesion having the same state as the one when the ink layer is printed, which enables the water pressure transfer of the print pattern 40 to be performed. At the same time as the above activation, a surplus portion 60R of the activator 60 used for activating the print pattern 40 is transferred to a space (a middle space) between the adjacent ink printed portions 41A of the print layer (the decoration layer) formed by the print pattern 40 of the transfer film 20 being transferred under water pressure while it is collected in the convex sate so that convex portions 60BP higher than the ink printed portions 41A are formed in the middle spaces 41B to impart three-dimensional concavo-convex tactile feeling. These convex portions 60BP are considered to be formed in the form where the surplus portion 60R of the activator applied on the transfer film 20 is transferred onto the surface of the article while it is collected between the ink printed portions 41A of the print pattern 40 on water pressure transfer so that the surplus portion 60R of the activator flows into the adjacent ink printed portions 41A as shown in FIGS. 8 (C) through 8(E), otherwise in the form where the surplus portion 60R of the activator is collected in the second area 41B by means of the repelling operation of the ink layer 40I in the first area 41A of the print pattern 40 and the collecting power of the activator 60 and thereafter, the concavo-convex reversal of the activator convex collection portions 60BP in the second area 41B is carried out on the surface of the article on water pressure transfer as shown in FIG. 9 (C) through 9(E) or in the form where these forms are combined.

The ultraviolet ray hardening resin composite which is a main component of the activator 60 of the invention is a resin which is able to be hardened for relatively shorter time by a chemical action of the ultraviolet rays as disclosed in Patent documents 2 through 6 and take the form of an ultraviolet ray hardening type paint, ultraviolet ray hardening type ink, UV cure adhesive, etc. according to its use, but fundamentally, the ultraviolet ray hardening resin composite is in liquid state before being hardened by the ultraviolet ray irradiation and includes a photo-polymerization component and a photo-polymerization initiator as an essential component. The photo-polymerization component includes a photo-polymerization monomer as an essential component and may further include a photo-polymerization oligomer as a second component. Thus, although the photo-polymerization oligomer is not an essential component, it may preferably include the photo-polymerization oligomer together with the photo-polymerization monomer for the purpose of improvement of film strength and adhesion after hardened by ultraviolet ray. The activator of the invention is characterized by being formed with a matting agent added to the ultraviolet ray hardening resin composite as described in details later. Of course, the activator is required to have predetermined viscosity and ink solubility.

The activator for water pressure transfer film of the invention (matting activator) comprises the ultraviolet ray hardening resin composite, the matting agent of resin beads and a resin bead gathering agent for acting on the matting agent to heighten the matting effect thereof. Among these components, the ultraviolet ray hardening resin composite includes the photo-polymerization component and a photo-polymerization initiator and the photo-polymerization component includes at least the photo-polymerization monomer (2) as an essential component and may further include a photo-polymerization oligomer (1) in addition to the photo-polymerization monomer (2). Stating the blend ratio of these components (1) through (3), they can be included at the following blend ratio with the sum total of the components (1) through (3) made into 100 weight %.

(Blend Ratio)

| | |
|---|---|
| (1) Photo-polymerization oligomer | 0 to 65 weight % |
| (2) Photo-polymerization monomer | 30 to 95 weight % |
| (3) photo-polymerization initiator | 5 to 10 weight % |

The ultraviolet ray hardening resin composite may contain the following additives (4) through (6) and the blend ratio of these additives is a ratio relative to the total (100 weight %) of the components (1) through (3). Therefore, the weight % of the whole ultraviolet ray hardening resin composite containing the additives will exceed 100 weight %.

| | |
|---|---|
| (4) Non-reactive resin | 2 to 12 weight % |
| (5) Light resistance imparting agent | |
| UV-A | 0.5 to 8 weight % |
| HALS | 1.5 to 3.5 weight % |
| (6) Leveling agent | 0.01 to 0.5 weight % |

The photo-polymerization oligomer is a polymer which can be further hardened by photochemistry action and is called a photo-polymerization unsaturated polymer, a base resin or a photo-polymerization pre-polymer. The photo-polymerization oligomer may be either one of acrylic oligomer, polyester oligomer, epoxy acrylate oligomer and urethane acrylate oligomer or an arbitrary combination of two or more of them and serves to preside mechanism or chemical characteristic of the decoration layer.

The photo-polymerization monomer is a non-solvent activating component in the ultraviolet ray hardening resin composite and has the solubility to dissolve the dried and solidified print pattern (ink) while playing a role to dilute the photo-polymerization oligomer to impart the adhesion to the print pattern and the photo-polymerization monomer itself carries out a hardening reaction on ultraviolet ray hardening so impart the hardenability to the decoration layer itself. The photopolymerization monomer used may preferably be a bi-functional monomer and may be 1.6 hexanediol diacrylate, cyclohexyl acrylate, di-propylene glycol di-acrylate, etc. suitably used. In consideration of permeability to the ink and solvent power of the ink and further of more suitable SP value, 1.6 hexanediol di-acrylate and di-propylene glycol di-acrylate may be preferably used. Furthermore, bi-functional monomer and multi-functional monomer such as tetra-functional monomer combined may be used.

The photo-polymerization initiator seizes to start a photo-polymerization reaction of the photo-polymerization oligomer and the photo-polymerization monomer and in order that in the activator of the invention, the ultraviolet ray hardening resin composite dissolves and permeates the dried and solidified ink, the photo-polymerization initiator may include both of surface hardening type photo-polymerization initiator and internal hardening type photo-polymerization initiator. A hydroxyl ketone initiator may be used, for example as the surface hardening type photo-polymerization initiator and an acyl phosphine oxide initiator may be used, for example as an internal hardening type photo-polymerization initiator.

The non-reactive resin among the aforementioned additives (4) through (6) may be acrylic polymer etc. and this non-reactive resin has the action to be compatible with properties such as mechanical and chemical characteristics etc. of the decoration layer formed by the water pressure transfer and the adhesion between the objective to be pattern-transferred and the decoration layer. The light resistance imparting agent may contain an ultraviolet ray absorbent (referred to as UV-A later) and a hindered amine light stabilizer (referred to as HALS later), which improves the light resistance with the adhesion maintained in the blend ratio of the specific range. The leveling agent can adjust the fluidity of the coating agent without damaging the adhesion nature of the decoration layer.

The activator 60 used for the invention is required to have the preferred viscosity range and SP value range in the same manner as disclosed in Patent document 5 and more particularly to have the viscosity range of 10-500 CPS (25 degree Celsius) and the ink solubility of SP value of 7 and more. The reason is the same as described in Patent Document 5. That is, if the viscosity is less than 10 CPS, then the content of the photo-polymerization monomer is too high, the satisfactory coated film property cannot be obtained and therefore even though the decorative layer has the ultraviolet ray hardening resin composite integrally combined and hardened by the ultraviolet ray it has no good results in a wiping test by solvents such as xylene. Reversely, if it exceeds 500 CPS, then the content of the photo-polymerization monomer is too low, the ultraviolet ray hardening resin composite cannot fully permeate the whole dried ink of the print pattern 40 and therefore the adhesion of the ink cannot be recovered in a good manner. If the ink solubility of the ultraviolet ray hardening resin composite has the SP value of less than then the print pattern 40, that is the decorative layer 44 is hard to be attached onto the article 10 after the water pressure transfer, even though the resin composite can permeate the dried ink of the print pattern 40 so as to recover the adhesion of the ink.

The preferred SP value of the activator of the invention is set at "7" lower than "10" which is the lower limn of the SP value of the conventional activator as disclosed in Patent Document 5. This is why the inventors have found in the course of making the invention of the present activator that the range of 7 through less than 10 of SP value also provide the ink solubility having no practical problem according to the affinity of the ink component of the print pattern and the activator.

As the photo-polymerization monomer has the viscosity of SP value of 3-30 CPS (25 degree Celsius) and the ink solubility of 7 or more, there can be easily prepared the ultraviolet ray hardening resin composite having the viscosity of SP value of 10-500 GPS (25 degree Celsius) and the ink solubility of 7 or more.

With the solubility of the ultraviolet ray hardening resin composite itself having the SP value of 7 or more, there can be presented sufficient ink solvent power because the solubility of the ultraviolet ray hardening resin composite becomes close to the solubility of the ink component of the print pattern 40.

What is meant by the term "CPS" in the viscosity of the ultraviolet ray hardening resin composite used for the invention is an abbreviation of "centipoises" as described in Patent Document 4. The numerical value used in the specification indicates the results obtained by measuring the viscosity using B-type viscometer (Form of BM) manufactured by Tokyo Reiki Co., Ltd.

The term "SP value" in the ink solubility of the ultraviolet ray hardening resin composite is an abbreviation of "Solubility Parameter" as described in Patent document 4 and it is what is depended on the turbidimetric titration method which Soe (K. W. SUE) and Clark (D. H. CLARKE) have announced. This turbidimetric titration method is described in Journal of Polymer Science PARTA-1, Vol. 5, and 1671-1681 (1967).

The activator 60 of the invention is characterized by adding resin beads which are a matting agent and a resin bead gathering agent which acts on the resin beads to improve a matting effect at a predetermined blend ratio in addition to the above-mentioned ultraviolet ray hardening resin composite. The amount of blend of the resin beads of the matting agent relative to the ultraviolet ray hardening resin composite is expressed by the weight ratio of the resin beads of the matting agent relative to the ultraviolet ray hardening resin composite and the weight ratio is 0.01-0.3. The amount of blend of the resin bead gathering agent is expressed by the weight ratio of the resin bead gathering agent relative to the resin beads and the weight ratio is adjusted within the range of 0.05-1.5 according to the amount of blend of the resin beads. With the matting agent and the resin bead gathering agent blend within such ranges, a desired matting effect is obtained and the decoration layer excellent also in efficiency of coating operation and film adhesion after hardened is obtained as described in details later. In case where the activator is applied to the concavo-convex design formation method, a desired matting effect can be obtained while an effective surface unevenness is formed. On the contrary if they are blended out of such ranges, there will tend to occur some troubles where it is difficult to obtain the desired matting effect and the efficiency of coating operation and the film adhesion after hardened are lowered and furthermore it is difficult to form the effective concavo-convex design formation method, which are undesirable.

The ranges of the amount of blend of the matting agent and the resin bead gathering agent are further described in details as follows.

(1) As the amount of blend of the resin beads which are the matting agent is less than 0.01 at the above-mentioned weight ratio, the desired matting effect cannot be obtained and as it exceeds 0.3, the fluidity of the ultraviolet ray hardening resin composite is lowered to thereby deteriorate the efficiency of coating operation and the film adhesion after hardened even though the matting effect is obtained and it is difficult to form the effective surface unevenness in the concavo-convex design formation method.

(2) The weight ratio of the resin beads and the resin bead gathering agent is necessary for obtaining both of the matting effect and various characteristics (typically the efficiency of coating operation, the film adhesion after hardened, etc.) with respect to the formation and the performances of the decoration layer in a good manner and to easily form the effective surface unevenness in case where the invention is applied to the concavo-convex design formation method. It is adjusted within the ranges of the weight ratio of the resin beads and the resin bead gathering agent according to the degree of the matting effect and various above-mentioned characteristics or the balance between them, it is adjusted within the limits of the weight ratio of the resin beads and the resin bead gathering agent. The lower limit of the weight ratio of the resin beads and the resin bead gathering agent is the value equivalent to the required minimum quantity of the resin bead gathering agent relative to the upper limit of the blend ratio of the resin beads relative to the above-mentioned ultraviolet ray hardening resin composite. On the other hand, the upper limit of the weight ratio of the resin beads and the resin bead gathering agent is the value equivalent to the required maximum quantity relative to the lower limit of the blend ratio of the resin beads relative to the above-mentioned ultraviolet ray hardening resin composite.

(3) If the amount of blend of the resin bead gathering agent is lower, then its action to gather the resin beads is lowered and if the mount of blend of the resin is higher, then it acts so that the viscosity of then activator is heightened. Therefore, the amount of blend of the resin bead gathering agent according to the amount of blend of the resin beads should be adjusted as follows:

(a) In case where the amount of blend of the resin beads is lesser (on the side of minimum value), the weight ratio of blend of the resin bead gathering agent relative to resin beads is adjusted to be made greater (on the side of maximum value) so that a little amount of resin beads are gathered to thereby easily form bead lamps, which can provide the matting effect and can accomplish the proper degree thereof.

(b) In case where the amount of blend of the resin beads is greater (on the side of maximum value), the weight ratio of blend of the resin bead gathering agent relative to the resin beads is adjusted to be made lesser (on the side of the minimum value) because the resin beads are easily gathered and the viscosity of the activator gets higher whereby the fluidity of the activator is improved to thereby obtain the good matting effect while maintaining the efficiency of coating operation of the activator, its film adhesion and the concavo-convex design formation.

(e) Stating a desirable example of such adjustment, in case where the weight ratio of the resin beads relative to the ultraviolet ray hardening resin composite is 0.15 or more, the weight ratio of the resin bead gathering agent relative to the resin beads is less than 0.7.

(d) In order to adjust various characteristics such as the matting effect, the efficiency of coating operation and the applicability to the concavo-convex design with sufficient balance, preferably, the weight ratio of blend of the resin beads relative to the ultraviolet ray hardening resin composite is 0.015 to 0.25 while the weight ratio of blend of the resin bead gathering agent relative to the resin beads is 0.1 to 1.2 and more preferably, the weight ratio of blend of the resin beads relative to the ultraviolet ray hardening resin composite is 0.02 to 0.2 while the weight ratio of blend of the resin bead gathering agent relative to the resin beads is 0.15 to 1.0 (compare Examples 20 and 21 with other Examples, which are described later)

(4) As understood from the foregoing, if the weight ratio of blend of the resin bead gathering agent relative to the resin bead is out of the range of 0.05 to 1.5, then the effect of the invention cannot be obtained even though the amount of blend of the resin beads falls within the preferable range. Therefore, in order to obtain the effect of the invention, it is important that the amount of blend of the resin beads which are the matting agent is set within the preferred range and also that the weight ratio of blend of the resin bead gathering agent relative to the resin beads according to the weight ratio of blend of the resin beads is so set as to fall within the preferred range. The weight of the ultraviolet ray hardening resin composite which is a standard of the weight ratio of blend of the resin bead should reduce the weight of a solvent in case where the ultraviolet ray hardening resin composite includes the solvent, which will be described later. The reason for this is that the components which contributes to the matting effect among the activator components are ones integrally combined with and included in the print layer as the hardened components after the activator is hardened and the component such as the solvent volatilized and disappearing in the process of water pressure transfer never contributes to the matting effect.

The viscosity of the activator 60 of the invention changes with the viscosity of the ultraviolet ray hardening resin composite and the amount of blend of the matting agent and the resin bead gathering agent relative to the whole activator, but the amount of blend of the matting agent and the resin bead gathering agent may be preferably determined so that the viscosity of the activator gets 1000 or less OPS (25 degree Celsius) from a viewpoint of the efficiency of coating operation of the activator. If the viscosity of the activator 60 exceeds 1000 CFS, then the activator 60 (more particularly the ultraviolet ray hardening resin component) does not fully permeate the whole dried ink of the print pattern 40 and therefore no good ink adhesion cannot be reproduced. The viscosity of the activator was measured by using the B-type-viscosity meter by Tokyo Keiki Co., Ltd. (form BM).

The desirable resin beads for functioning as the matting agent may be particulates made of resin and may be used by selecting any publicly known ones having a matting function such as PE (polyethylene) beads, urethane beads and silicone beads etc., or combining two or more of them. The desirable particle diameter (referred to as bead diameter later) of these resin beads is 5-20 micrometers, the resin beads of single bead diameter may be used or the resin beads of different bead diameter mixed may be used. The reason for using the resin beads of different bead diameter is that as the resin beads of different bead diameter are gathered so that beads lumps are formed, crevices between bigger bead lamps formed including many resin beads of large diameter are filled up with smaller bead lamps containing the resin beads of small diameter whereby there occur no crevices in the matting agent. This preferably enables the matting effect to increase in comparison with the case where there are crevices between adjacent headlamps. If the bead diameter of the resin beads is less than 5 micrometers, then the viscosity of the activator increases, there cannot be obtained the matting effect sufficient within the range of such an amount of addition as satisfies the efficiency of coating operation. On the other hand, if the bead diameter of the resin beads exceeds 20 micrometers, the matting effect is heightened, but there sometimes undesirably occur defects of producing lack of uniformity of the matting effect by a state of the roughness of the design surface and the roughness and fineness of distribution of the matting agent. Although the shape of the resin beads is not limited so long as it can present the matting effect, it may preferably have a globular form (including a polyhedron near the globular form) from a viewpoint of the efficiency of coating operation of the activator.

The resin bead gathering agent serves to impart the thixotropy to the activator as already described while preventing the precipitation of the resin beads of the matting agent in the activator to gather a plurality of resin beads to form a plurality of bead lamps whereby the matting effect of the matting agent is improved. The component for imparting the thixotropy as such resin bead gathering agent used may be an organic thickener or an inorganic particulate silica etc., for example, but the particulate silica may be preferable because it has a high imparting action of thickening to the activator and there is little bad influence onto the physical properties and storage stability required for the activator.

The particulate silica used may be various publicly known one having one or both of hydrophile and hydrophobic properties, but since hydrophilic silica has compatibility with water and therefore the activator absorbs water to thereby sometimes provide an inconvenience to the ultraviolet ray hardened article, in case where such an inconvenience needs to be avoided or reduced, the hydrophobic silica may be preferably used. This hydrophobic silica has the forms of dry type composite and of wet composite, both of them may be used and especially there may be preferably used the particulate silica of dry type composite excellent in the synergistic effect with the matting agent resulting from the dispersibility and the distribution structure (network formation described later) in the activator. The action of imparting the thixotropy to the activator gets larger because the matting effect gets larger as the primary particle diameter (particle diameter of the primary particle before flocculated in the form of chain) of the particulate silica is smaller than the particle diameter of the resin beads and the primary particle diameter of particulate silica gets smaller. Since with the primary diameter of the particulate silica smaller, there tends to occur the phenomena in which the uniform distribution of the particulate silica into the activator becomes difficult and the efficiency of coating operation and the design nature after hardened are lowered, the primary particle diameter of the particulate silica may be preferably selected in consideration of the balance of the matting effect, the efficiency of coating operation and the design nature. The concrete primary particle diameter of the particulate silica is desirably 0.005-10 micrometers, more desirably 0.007-1 micrometer and much more desirably 0.010-0.1 micrometer. The particle diameter of the particulate silica is undesirably less than 0.005 micrometer because there occur such cases as the efficiency of coating operation is reduced and the finished design surface is rough even though the matting effect is obtained. The particle diameter of the particulate silica undesirably exceeds 10 micrometers because it is difficult to gather the resin beads due to the small action of imparting the thixotropy to the activator and therefore the matting effect is remarkably reduced. The preferred particulate silica of dry type composite may be a fumed silica represented by AEROSIL (registered trademark) of Nippon Aerosil Co., Ltd., REOLOSIL (registered trademark) of Tokuyama Corporation and CAB-O-SIL (registered trademark) of Cabot Corporation. The numerical value of the primary be NIPSIL (registered trademark) Nihon Silica Industrial Co., Ltd., Sylisia (registered trademark) of Fuji Sylisia Chemical Ltd., TOKUSIL (registered trademark) of Tokuyama Corporation, etc. The numerical value of the primary particle diameter of the particulate silica is the one obtained by measuring and arithmetically averaging the longest diameter of each outline of the primary particle picture of 1000 particulate silicas selected at random, respectively in the picture of the magnification which can recognize the primary particle visually with SEM or TEM (transmission electron microscope).

Hydrophobic treatment of the particulate silica can be performed by a conventional treatment method, but it may be preferably performed by a silane treatment or silazane treatment. Preferably, the silane treatment may be made by chlorosilanes such as dimethyl-dichlorosilane, trimethyl-dichlorosilane or alkyl-silylation agent such as octylsilane while the silazane treatment may be made by hexamethyl-disilazane etc. The dimethyl-dichlorosilane treatment may be preferred from the viewpoint of the balance of an orientation effect of the matting agent, the efficiency of coating operation before hardened and the matting effect after hardened.

Figure 4:
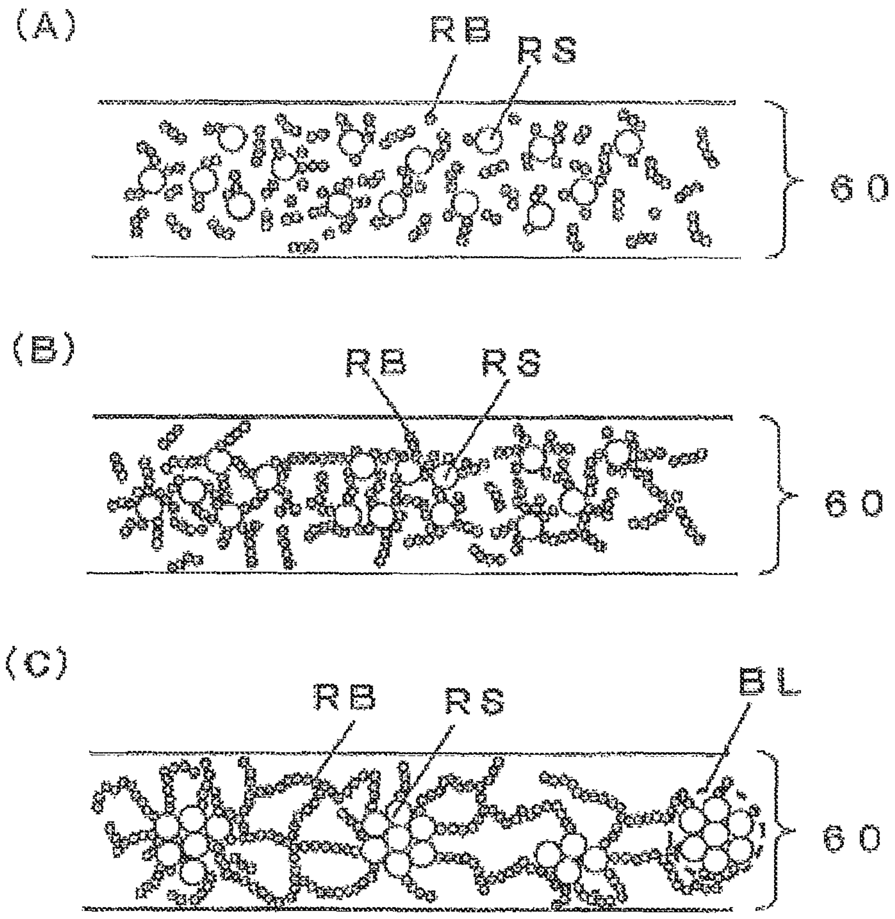
FIG. 4 is a schematic diagram sequentially illustrating in (A) through (C) steps in which the matting agent changes to a plurality of lumps by the resin bead gathering agent when the matting activator of the invention is applied to a transfer film.
Figure 5:
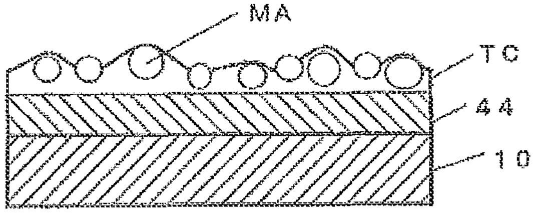
FIG. 5 is an enlarged cross sectional view of a topcoat layer showing a state of distribution of a matting agent according to the conventional art.
Figure 6:
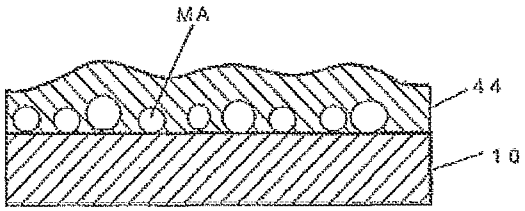
FIG. 6 is an enlarged cross sectional view of a decoration layer showing a state of distribution of the matting agent in the decoration layer obtained by the activator of the ultraviolet ray hardening resin composite according to a conventional art permeating the print pattern and hardened after transfer.
Figure 7:
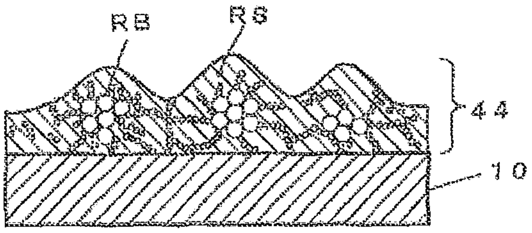
FIG. 7 is an enlarged cross sectional view of the decoration layer showing a state of distribution of the matting agent in the decoration layer obtained by the activator of the invention permeating the print pattern and hardened after transfer.

In the form of embodiment wherein particulate silica of the resin bead gathering agent is blended with the resin beads of the matting agent added to the activator at a predetermined blend ratio, as shown in FIG. 4, the particulate silica FS is connected in the shape of a chain around the resin beads RB as a core in the activator to form a line-like or mesh-like structure (referred to as a network structure). Since the thixotropy is imparted to the activator by the network structure, with the activator agitated while shearing force is acted to the activator before applied, the network structure of particulate silica FS is broken and therefore the resin beads are more easily distributed (see FIG. 4A). On the other hand, after the activator is applied, which never causes the shearing force to be acted, the network structure of particulate silica FS broken by the shearing force is again formed and the resin beads RB uniformly distributed are gathered through the network structure of particulate silica FS to form particle groups (see FIGS. 4B and 4C). The thus formed particulate groups act like the resin beads of bigger particle diameter and as a result, even though the amount of addition of resin beads RB is not so much, the bigger matting effect can be imparted to the decoration layer 44, as shown in FIG. 7 and also the efficiency of application of the activator and the permeability of the activator to the ink of the print pattern can be improved, which can maintain a good membranous property of the decoration layer 44 (the surface protection function and adhesion).

The thickener of another example of the resin bead gathering agent, which may be used, is a publicly known fatty acid amide or polyolefin etc. In the form of embodiment wherein the thickener as the resin bead gathering agent is blended to the rosin beads of the matting agent, since the thixotropy can be imparted to the activator by the thickener in the same manner as in case of the particulate silica, when the activator is agitated before applied, the resin beads are easily distributed in a uniform manner. On the other hand, after the activator is applied, the resin beads RB are again gathered through the network structure to form the particle groups so as to have the bigger particle diameter. Thus, even though the amount of addition of the resin beads RB is not so much, the bigger matting effect can be imparted to the decoration layer 44 and also the efficiency of application of the activator and the permeability of the activator to the ink of the print pattern can be improved, which can maintain a good membranous property of the decoration layer 44 (the surface protection function and adhesion).

With the dispersibility of the matting agent in the decoration layer 44 improved, the good matting effect can be given to the ink of not only black ink but also of blue, red and yellow inks and therefore, the original matting design can be realized.

In the water pressure transfer method for imparting the design of finger touch feeling by the fine convex portions (concavo-convex design) as disclosed in the Patent Document No. 6, the matting effect by the matting agent in accordance with the conventional technology and the effect of the design of finger touch feeling are contrary to each other, but with the matting activator of the invention used for such a water pressure transfer method (corresponding to the method illustrated in FIGS. 8 and 9), since the good matting effect can be obtained without increase in the amount of addition of the matting agent, the matting effect and the effect of the design of finger touch feeling can be obtained simultaneously and therefore, the matting activator according to the invention is effective especially in the water pressure transfer method illustrated in FIGS. 8 and 9 which imparts such a finger touch feeling design.

The matting activator of the invention may contain a solvent for distributing a viscosity control agent and a non-reactive resin which is an additive. It should be understood that the "solvent" contained in this matting activator should be used with the characteristic (solvent power) which never prevents the activation of the print pattern by the photo-polymerization monomer of the ultraviolet ray hardening resin composite which is the main component of the activator and with the amount of addition thereof. The fundamental difference between a solvent type activator and the non-solvent type activating component of the ultraviolet ray hardening resin composite is that the solvent component of the former activator volatizes after applied and therefore the plastic state due to the adhesion reappearance of the ink changes temporally, but the latter activator (the activating component used for the invention) reproduces the adhesion of the ink by the photo-polymerization monomer component which never volatilizes and therefore the plastic state of the ink never changes. If the activator of the invention has the specific range of the amount of blend of the photo-polymerization monomer, then the plastic state of the ink is never damaged, even though the solvent coexists in the range which fulfills the above-mentioned conditions. Such desirable amount of addition of the solvent to distribute the non-reactive resin is 5 to 50 weight % relative to the sum total of photo-polymerization oligomer, the photo-polymerization monomer and the photo-polymerization initiator among the ultraviolet ray hardening resin composite.

EXAMPLES

Examples 1 through 36 and Comparisons 1 through 13

Concrete Examples 1 through 36 of the invention will be explained below while comparing them with Comparisons 1 through 13. Among these Examples and Comparisons, the ultraviolet ray hardening resin composite of Examples 1 through 13, Examples 16 through 32, Examples 34 through 36 and Comparisons 1 through 13 had the composite shown in Table 1 while the ultraviolet ray hardening resin composite of Examples 14, 15 and 33 bad composite of Table 2.

TABLE 1

| Composition | Ingredient or product name | Blend (weight part) |
|---|---|---|
| Penta-functional monomer | dipentaerythrirol-pentaacrylate (viscosity 1000 CPS, molecular weight 754) | 50 |
| Bi-functional monomer | 1,6-hexanediol-diacrylate (viscosity 7 CPS, molecular weight 226) | 50 |
| Photo-polymerization initiator | 1 to 1 mixture of hydroxy ketone and acylphosphine oxide | 7 |
| Acrylic polymer | Weight average molecular weight of 75000 (added while dissolved in bi-functional monomer | 5 |
| Leveling agent | BYK-UV3500 manufactured by BYK Japan (BYK is the registered trademark | 0.25 |

TABLE 2

| Composition | Ingredient of product name | Blend (weight part) |
|---|---|---|
| Hexa-functional oligomer | UH-3320HA manufactured by Negami Chemical Industries Co., Ltd. | 29.5 |
| Bi-functional oligomer | EBECRYL 676 manufactured by Daicel-Cytec Co., Ltd. | 10.7 |
| Bi-functional monomer | 1,6-hexanediol-diacrylate (viscosity 7 CPS, molecular weight 226) | 49.2 |
| Photo-polymerization initiator | 1 to 1 mixture of hydroxy ketone and acylphosphine oxide | 7 |
| Acrylic polymer | UBIC polymer manufactured by Ohashi Chemical Industries Ltd. (Weight average molecular weight of 75000 and 40% solid distributed in solvent | 3.6 |
| Leveling agent | BYK-UV3500 manufactured by BYK Japan (BYK is the registered trademark | 0.03 |

In Examples 1 through 36 and Comparisons 1 through 13, the particle diameter of the resin beads and the amount of addition thereof, the component of the resin bead gathering agent and the amount of addition the root and other conditions surface treatment of the particulate silica, the primary particle diameter thereof and the weight ratio thereof relative to the matting agent) are as shown in Tables 3 through 11, respectively. The resin beads of various particle diameters used in these Examples (excluding Example 22 through 25) and Comparisons are PE (polyethylene) beads and FLO-BEADS LE-1080 (particle diameter of 6 micrometers), FLO-BEADS LE-2080 (particle diameter of 11 manometers) and FLO-THENE UF-80 (particle diameter of 20 micrometers), all of which were manufactured by Sumitomo Seika Chemicals Co. Ltd. were used for every particle diameter, respectively. In Examples 22, 23 and 24, there were used, the silicone resin beads and more concretely, there were used silicone compound powders KMP-600 (particle diameter of 5 micrometers), KMP-605 (particle diameter of 2 micrometers) and KMP-602 (particle diameter of 30 micrometers) manufactured by Shin-Etsu Chemical Co., Ltd., respectively. In Example 25, there were used the urethane resin beads (DAIMICBEAZ UCN-8070CM CLEAR (particle diameter of 7 micrometers) manufactured by Dainichiseika Colour & Chemicals Mfg. Co., Ltd.). The particle diameter of these resin beads was the value (median diameter: $D_{50}$) obtained by averaging after measurement by the laser diffraction type she distribution measuring system (Shimadzu Corporation SALD-2000J) based on the laser diffracting method of JIS 28825-1. The diameter of the primary particle of the particulate silica was measured by using TEM (H-8100 manufactured by Hitachi High-Tech Company).

TABLE 3

| SPECIFICATIONS | | | | Example 1 | Example 2 | Example 3 | Example 4 | Example 5 | Example 6 |
|---|---|---|---|---|---|---|---|---|---|
| Blend | A: Ultraviolet ray hardening resin composite (Weight part) | | | 112.25 | 112.25 | 112.25 | 112.25 | 112.25 | 112.25 |
| | Matting agent/Resin beads | Particle diamedter (μm) | | 6 | 6 | 6 | 6 | 6 | 20 |
| | | B: Amount of addition (Weight part) | | 20 | 20 | 20 | 20 | 20 | 20 |
| | | Weight ratio (B/A) | | 0.18 | 0.18 | 0.18 | 0.18 | 0.18 | 0.18 |
| | Resin bead gathering agent | Particulate silica | Silica No. | A | B | C | D | — | B |
| | | | Surface treatment | Silane-a | Silane-a | Silane-b | Silane-c | — | Silane-a |
| | | | Primary particle diameter (μm) | 0.012 | 0.015 | 0.012 | 0.012 | — | 0.015 |
| | | | C: Amount of addition (Weight part) | 5 | 5 | 5 | 5 | — | 2.5 |

TABLE 3-continued

| SPECIFICATIONS | | | | Example 1 | Example 2 | Example 3 | Example 4 | Example 5 | Example 6 |
|---|---|---|---|---|---|---|---|---|---|
| | | | Weight ratio (C/B) | 0.25 | 0.25 | 0.25 | 0.25 | — | 0.125 |
| | Thickener | | D: Amount of addition (Weight part) | — | — | — | — | 5 | — |
| | | | Weight ratio (D/B) | — | — | — | — | 0.25 | — |
| Evaluation | | | Efficiency of coating operation | ○ | ○ | ○ | ○ | ○ | ○ |
| | Gloss | | Judgment | ◎ | ○ | Δ | Δ | ○ | ○ |
| | | Gloss value | Yellow | 23 | 21 | 41 | 54 | 22 | 30 |
| | | | Red | 18 | 23 | 33 | 43 | 20 | 25 |
| | | | Blue | 17 | 22 | 23 | 21 | 30 | 20 |
| | | | Black | 5 | 5 | 6 | 7 | 5 | 5 |
| | | | Appearance of concavo-convex design | Δ | ○ | ○ | ○ | Δ | ○ |
| | | | Evaluation of adhesion | ○ | ○ | ○ | ○ | ○ | ○ |

TABLE 4

| SPECIFICATIONS | | | | Example 7 | Example 8 | Example 9 | Example 10 | Example 11 | Example 12 |
|---|---|---|---|---|---|---|---|---|---|
| Blend | | | A: Ultraviolet ray hardening resin composite (Weight part) | 112.25 | 112.25 | 112.25 | 112.25 | 112.25 | 112.25 |
| | Matting agent/Resin beads | | Particle diamedter (μm) | 11 | 11 | 11 | 11 | 11 | 11 |
| | | | B: Amount of addition (Weight part) | 20 | 20 | 20 | 20 | 20 | 20 |
| | | | Weight ratio (B/A) | 0.18 | 0.18 | 0.18 | 0.18 | 0.18 | 0.18 |
| | Resin bead gathering agent | Particulate silica | Silica No. | B | B | B | F | G | H |
| | | | Surface treatment | Silane-a | Silane-a | Silane-a | Silazane | Siloxane | Silane-b |
| | | | Primary particle diameter (μm) | 0.015 | 0.015 | 0.015 | 0.007 | 0.040 | 0.2 |
| | | | C: Amount of addition (Weight part) | 5 | 7.5 | 12.5 | 5 | 5 | 5 |
| | | | Weight ratio (C/B) | 0.25 | 0.375 | 0.625 | 0.25 | 0.25 | 0.25 |
| | | Thickener | D: Amount of addition (Weight part) | — | — | — | — | — | — |
| | | | Weight ratio (D/B) | — | — | — | — | — | — |
| Evaluation | | | Efficiency of coating operation | ○ | ○ | ○ | Δ | ○ | ○ |
| | Gloss | | Judgment | ◎ | ◎ | ◎ | ◎ | ◎ | Δ |
| | | Gloss value | Yellow | 19 | 13 | 13 | 11 | 20 | 45 |
| | | | Red | 12 | 10 | 11 | 6 | 15 | 42 |
| | | | Blue | 8 | 8 | 6 | 6 | 9 | 30 |
| | | | Black | 5 | 5 | 5 | 5 | 5 | 6 |
| | | | Appearance of concavo-convex design | ○ | ○ | Δ | Δ | ○ | ○ |
| | | | Evaluation of adhesion | ○ | ○ | ○ | ○ | ○ | ○ |

TABLE 5

| SPECIFICATIONS | | | | Example 13 | Example 14 | Example 15 | Example 16 | Example 17 | Example 18 |
|---|---|---|---|---|---|---|---|---|---|
| Blend | | | A: Ultraviolet ray hardening resin composite (Weight part) | 112.25 | 97.87 | 97.87 | 112.25 | 112.25 | 112.25 |
| | Matting agent/Resin beads | | Particle diamedter (μm) | 11 | 6 | 11 | 20 | 20 | 20 |
| | | | B: Amount of addition (Weight part) | 20 | 20 | 20 | 20 | 20 | 5.6 |
| | | | Weight ratio (B/A) | 0.18 | 0.20 | 0.20 | 0.18 | 0.18 | 0.05 |
| | Resin bead gathering agent | Particulate silica | Silica No. | I | A | B | K | J | A |
| | | | Surface treatment | Silane-a | Silane-a | Silane-a | Silane-a | Silazane | Silane-a |
| | | | Primary particle diameter (μm) | 5 | 0.012 | 0.015 | 10 | 12 | 0.012 |
| | | | C: Amount of addition (Weight part) | 5 | 5 | 7.5 | 5 | 5 | 5 |
| | | | Weight ratio (C/B) | 0.25 | 0.25 | 0.375 | 0.25 | 0.25 | 0.9 |
| | | Thickener | D: Amount of addition (Weight part) | — | — | — | — | — | — |
| | | | Weight ratio (D/B) | — | — | — | — | — | — |
| Evaluation | | | Efficiency of coating operation | ○ | ○ | ○ | ○ | Δ | ◎ |
| | Gloss | | Judgment | Δ | ◎ | ◎ | Δ | Δ | Δ |
| | | Gloss value | Yellow | 53 | 23 | 13 | 47 | 54 | 52 |
| | | | Red | 40 | 18 | 10 | 41 | 48 | 43 |
| | | | Blue | 25 | 17 | 8 | 35 | 45 | 40 |
| | | | Black | 7 | 5 | 5 | 6 | 7 | 7 |
| | | | Appearance of concavo-convex design | ◎ | Δ | ○ | ○ | ○ | ○ |
| | | | Evaluation of adhesion | ○ | ○ | ○ | ○ | ○ | ○ |

TABLE 6

| SPECIFICATIONS | | | | Example 19 | Example 20 | Example 21 | Example 22 | Example 23 | Example 24 |
|---|---|---|---|---|---|---|---|---|---|
| Blend | A: Ultraviolet ray hardening resin composite (Weight part) | | | 112.25 | 112.25 | 112.25 | 112.25 | 112.25 | 112.25 |
| | Matting agent/Resin beads | | Particle diamedter (μm) | 11 | 11 | 11 | 5 | 2 | 30 |
| | | | B: Amount of addition (Weight part) | 28.1 | 1.12 | 33.6 | 20 | 20 | 20 |
| | | | Weight ratio (B/A) | 0.25 | 0.01 | 0.30 | 0.18 | 0.18 | 0.18 |
| | Resin bead gathering agent | Particulate silica | Silica No. | A | A | A | B | B | B |
| | | | Surface treatment | Silane-a | Silane-a | Silane-a | Silane-a | Silane-a | Silane-a |
| | | | Primary particle diameter (μm) | 0.012 | 0.012 | 0.012 | 0.015 | 0.015 | 0.015 |
| | | | C: Amount of addition (Weight part) | 4.2 | 1.68 | 1.7 | 5 | 5 | 5 |
| | | | Weight ratio (C/B) | 0.15 | 1.5 | 0.05 | 0.25 | 0.25 | 0.25 |
| | | Thickener | D: Amount of addition (Weight part) | — | — | — | — | — | — |
| | | | Weight ratio (D/B) | — | — | — | — | — | — |
| Evaluation | Efficiency of coating operation | | | Δ | Δ | Δ | ○ | Δ | ○ |
| | Gloss | | Judgment | ◎ | Δ | Δ | ○ | ○ | ○ |
| | | Gloss value | Yellow | 20 | 54 | 45 | 23 | 20 | 25 |
| | | | Red | 15 | 47 | 34 | 21 | 24 | 20 |
| | | | Blue | 10 | 40 | 35 | 25 | 22 | 25 |
| | | | Black | 5 | 7 | 6 | 5 | 5 | 5 |
| | Appearance of concavo-convex design | | | Δ | ○ | Δ | ○ | Δ | Δ |
| | Evaluation of adhesion | | | ○ | ○ | ○ | ○ | ○ | ○ |

TABLE 7

| SPECIFICATIONS | | | | Example 25 | Example 26 | Example 27 | Example 28 | Example 29 | Example 30 |
|---|---|---|---|---|---|---|---|---|---|
| Blend | A: Ultraviolet ray hardening resin composite (Weight part) | | | 112.25 | 112.25 | 112.25 | 112.25 | 112.25 | 112.25 |
| | Matting agent/Resin beads | | Particle diamedter (μm) | 7 | 11 | 11 | 11 | 6 | 20 |
| | | | B: Amount of addition (Weight part) | 20 | 20 | 20 | 20 | 14.6 | 11.2 |
| | | | Weight ratio (B/A) | 0.18 | 0.18 | 0.18 | 0.18 | 0.13 | 0.1 |
| | Resin bead gathering agent | Particulate silica | Silica No. | B | M | L | N | B | B |
| | | | Surface treatment | Silane-a | — | — | — | Silane-a | Silane-a |
| | | | Primary particle diameter (μm) | 0.015 | 0.007 | 0.015 | 5 | 0.015 | 0.015 |
| | | | C: Amount of addition (Weight part) | 5 | 5 | 5 | 5 | 3.7 | 1.4 |
| | | | Weight ratio (C/B) | 0.25 | 0.25 | 0.25 | 0.25 | 0.25 | 0.125 |
| | | Thickener | D: Amount of addition (Weight part) | — | — | — | — | — | — |
| | | | Weight ratio (D/B) | — | — | — | — | — | — |
| Evaluation | Efficiency of coating operation | | | ○ | Δ | ○ | ○ | ○ | ○ |
| | Gloss | | Judgment | ○ | ◎ | ◎ | Δ | ○ | ○ |
| | | Gloss value | Yellow | 20 | 15 | 18 | 54 | 26 | 32 |
| | | | Red | 26 | 8 | 15 | 38 | 26 | 26 |
| | | | Blue | 25 | 7 | 10 | 27 | 24 | 23 |
| | | | Black | 5 | 5 | 5 | 7 | 5 | 5 |
| | Appearance of concavo-convex design | | | ○ | Δ | ○ | ◎ | ○ | ○ |
| | Evaluation of adhesion | | | ○ | ○ | ○ | ○ | ○ | ○ |

TABLE 8

| SPECIFICATIONS | | | | Example 31 | Example 32 | Example 33 | Example 34 | Example 35 | Example 36 |
|---|---|---|---|---|---|---|---|---|---|
| Blend | A: Ultraviolet ray hardening resin composite (Weight part) | | | 112.25 | 112.25 | 97.87 | 112.25 | 112.25 | 112.25 |
| | Matting agent/Resin beads | | Particle diamedter (μm) | 11 | 11 | 11 | 11 | 11 | 11 |
| | | | B: Amount of addition (Weight part) | 11.2 | 13.5 | 9.8 | 20 | 33.6 | 20 |
| | | | Weight ratio (B/A) | 0.1 | 0.12 | 0.1 | 0.18 | 0.3 | 0.18 |
| | Resin bead gathering agent | Particulate silica | Silica No. | B | I | B | B | — | — |
| | | | Surface treatment | Silane-a | Silane-a | Silane-a | Silane-a | — | — |
| | | | Primary particle diameter (μm) | 0.015 | 5 | 0.015 | 0.015 | — | — |
| | | | C: Amount of addition (Weight part) | 4.5 | 5.4 | 3.7 | 14.4 | — | — |
| | | | Weight ratio (C/B) | 0.4 | 0.4 | 0.375 | 0.72 | — | — |
| | | Thickener | D: Amount of addition | — | — | — | — | 1.7 | 30 |

TABLE 8-continued

| SPECIFICATIONS | | | | Example 31 | Example 32 | Example 33 | Example 34 | Example 35 | Example 36 |
|---|---|---|---|---|---|---|---|---|---|
| | | | (Weight part) | | | | | | |
| | | | Weight ratio (D/B) | — | — | — | — | 0.05 | 1.5 |
| Evaluation | Efficiency of coating operation | | | ○ | ○ | ○ | Δ | Δ | ○ |
| | Gloss | Judgment | | ◎ | Δ | ◎ | ◎ | Δ | Δ |
| | | Gloss value | Yellow | 20 | 53 | 15 | 10 | 45 | 54 |
| | | | Red | 15 | 40 | 12 | 9 | 34 | 45 |
| | | | Blue | 10 | 25 | 9 | 5 | 35 | 38 |
| | | | Black | 5 | 7 | 5 | 5 | 6 | 7 |
| | Appearance of concavo-convex design | | | ○ | ◎ | ○ | Δ | Δ | Δ |
| | Evaluation of adhesion | | | ○ | ○ | ○ | ○ | ○ | ○ |

TABLE 9

| SPECIFICATIONS | | | | Comparison 1 | Comparison 2 | Comparison 3 | Comparison 4 | Comparison 5 |
|---|---|---|---|---|---|---|---|---|
| Blend | A: Ultraviolet ray hardening resin composite (Weight part) | | | 112.25 | 112.25 | 112.25 | 112.25 | 112.25 |
| | Matting agent/Resin beads | | Particle diamedter (μm) | 6 | 6 | 11 | 11 | — |
| | | | B: Amount of addition (Weight part) | 20 | 30 | 35 | 40 | — |
| | | | Weight ratio (B/A) | 0.18 | 0.27 | 0.31 | 0.36 | — |
| | Resin bead gathering agent | Particulate silica | Silica No. | | | | | E |
| | | | Surface treatment | — | — | — | — | Silazane |
| | | | Primary particle diameter (μm) | — | — | — | — | 0.012 |
| | | | C: Amount of addition (Weight part) | — | — | — | — | 5 |
| | | | Weight ratio (C/B) | — | — | — | — | — |
| | | Thickener | D: Amount of addition (Weight part) | — | — | — | — | — |
| | | | Weight ratio (D/B) | — | — | — | — | — |
| Evaluation | Efficiency of coating operation | | | ○ | ○ | X | X | ○ |
| | Gloss | Judgment | | X | X | Δ | ○ | X |
| | | Gloss value | Yellow | 58 | 56 | 42 | 27 | 73 |
| | | | Red | 44 | 33 | 33 | 16 | 71 |
| | | | Blue | 38 | 35 | 33 | 20 | 72 |
| | | | Black | 7 | 7 | 6 | 5 | 12 |
| | Appearance of concavo-convex design | | | ○ | ○ | ○ | X | ○ |
| | Evaluation of adhesion | | | ○ | ○ | ○ | ○ | ○ |

TABLE 10

| SPECIFICATIONS | | | | Comparison 6 | Comparison 7 | Comparison 8 | Comparison 9 | Comparison 10 |
|---|---|---|---|---|---|---|---|---|
| Blend | A: Ultraviolet ray hardening resin composite (Weight part) | | | 112.25 | 112.25 | 112.25 | 112.25 | 112.25 |
| | Matting agent/Resin beads | | Particle diamedter (μm) | — | 11 | 11 | 11 | 11 |
| | | | B: Amount of addition (Weight part) | — | 20 | 40 | 33.6 | 0.56 |
| | | | Weight ratio (B/A) | — | 0.18 | 0.36 | 0.30 | 0.005 |
| | Resin bead gathering agent | Particulate silica | Silica No. | B | A | A | B | A |
| | | | Surface treatment | Silane-a | Silane-a | Silane-a | Silane-a | Silane-a |
| | | | Primary particle diameter (μm) | 0.015 | 0.012 | 0.012 | 0.015 | 0.012 |
| | | | C: Amount of addition (Weight part) | 5 | 34 | 2 | 1 | 0.85 |
| | | | Weight ratio (C/B) | — | 1.7 | 0.05 | 0.03 | 1.5 |
| | | Thickener | D: Amount of addition (Weight part) | — | — | — | — | — |
| | | | Weight ratio (D/B) | — | — | — | — | — |
| Evaluation | Efficiency of coating operation | | | ○ | X | X | ○ | ○ |
| | Gloss | Judgment | | X | Evaluation impossible because of considerable impossibility of coating operation | | X | X |
| | | Gloss value | Yellow | 70 | | | 56 | 75 |
| | | | Red | 67 | | | 35 | 70 |
| | | | Blue | 66 | | | 35 | 74 |
| | | | Black | 12 | | | 7 | 12 |
| | Appearance of concavo-convex design | | | ○ | X | X | ○ | ○ |
| | Evaluation of adhesion | | | ○ | X | X | ○ | ○ |

TABLE 11

| SPECIFICATIONS | | | | | Comparison 11 | Comparison 12 | Comparison 13 |
|---|---|---|---|---|---|---|---|
| Blend | A: Ultraviolet ray hardening resin composite (Weight part) | | | | 112.25 | 112.25 | 112.25 |
| | Matting agent/Resin beads | | Particle diamedter (μm) | | — | 6 | 6 |
| | | | B: Amount of addition (Weight part) | | — | 30 | 10 |
| | | | Weight ratio (B/A) | | — | 0.27 | 0.09 |
| | Resin bead gathering agent | Particulate silica | Silica No. | | — | — | — |
| | | | Surface treatment | | — | — | — |
| | | | Primary particle diameter (μm) | | — | — | — |
| | | | C: Amount of addition (Weight part) | | — | — | — |
| | | | Weight ration (C/B) | | — | — | — |
| | | Thickener | D: Amount of addition (Weight part) | | 10 | 1 | 17 |
| | | | Weight ratio (D/B) | | — | 0.03 | 1.7 |
| Evaluation | Efficiency of coating operation | | | | ○ | ○ | X |
| | Gloss | Judgment | | | X | X | X |
| | | Gloss value | Yellow | | 75 | 60 | 65 |
| | | | Red | | 70 | 33 | 33 |
| | | | Blue | | 68 | 34 | 34 |
| | | | Black | | 12 | 10 | 10 |
| | Appearance of concavo-convex design | | | | ○ | Δ | Δ |
| | Evaluation of adhesion | | | | Δ | ○ | X |

In Tables 3 through 11, the particulate silica used was as shown in Table 12 and the respective processing agents for the surface treatment of the particulate silica were described as follows.

Silan-a: dimethyl-dichlorosilane
Silan-b: octylsilane
Silan-c: methachryloxy-silane
Silaxane: hexamethyl-disilazane
Siloxane: dimethyl-siloxane "A" through "K" in Table 12 designate the hydrophobic particulate silica and "L" through "N" designate the hydrophilic particulate silica. "I", "J" and "K" among the hydrophobic particulate silica was the one obtained by hydrophobic treatment of the non-hydrophobic particulate silica in the following steps.

(a) Particulate silica of 26 g, distilled water of 150 g and isopropanol of 51 g were added in a flask of 100 ml.

(b) The thus obtained aqueous suspension was agitated for five minutes and then dimethyl-dichlorosilane was dropped in and added to the agitated solution for three minutes, while continuously agitating the suspension.

(c) Next, continuously agitating the suspension, it was heated and flew back for 30 minutes. Toluene of 200 ml was added to the cooled suspension.

(d) Agitating the thus obtained two systems, the hydrophobic silica was moved to toluene phase and the aqueous phase was separated from toluene phase within the separating funnel.

(e) The toluene phase containing the hydrophobic sedimentation silica was washed by distilled water of 300 ml three times.

(f) Remaining water was removed from the toluene phase washed by azeotropic distillation and thereafter, it was distilled in order to remove the toluene continuously.

(g) The collected hydrophobic sedimentation silica was dried at 130 degree Celsius within an oven for 24 hours.

TABLE 12

| Silica No. | Brand name | Company name | Surface treatment |
|---|---|---|---|
| A | AEROSIL R9200 | Nippon Aerosil Co., Ltd. | Dimethyl-dichlorosilane |
| B | REOLOSIL DM10 | Tokuyama Corporation | Dimethyl-dichlorosilane |
| C | AEROSIL R816 | Nippon Aerosil Co., Ltd. | Octylsilane |
| D | AEROSIL R7200 | Nippon Aerosil Co., Ltd. | methachryloxy-silane |
| E | REOLOSIL HM-20L | Tokuyama Corporation | Hexamethyl-disilazane |
| F | REOLOSIL HM-30S | Tokuyama Corporation | Hexamethyl-disilazane |
| G | AEROSIL RY50 | Nippon Aerosil Co., Ltd. | Dimmethyl-siloxane |
| H | TS-382 | Cabot Corporation | Octylsilane |
| I | SP Seal H | Kaleido Corporation | Dimethyl-dichlorosilane |
| J | HIPRESICA TS(12 μm) | Ube Nitto Kasei Co., Ltd. | Dimethyl-dichlorosilane |
| K | HIPRESICA SQ(10 μm) | Ube Nitto Kasei Co., Ltd. | Dimethyl-dichlorosilane |
| L | AEROSIL 200 | Nippon Aerosil Co., Ltd. | No hydrophobic treatment |
| M | AEROSIL 90G | Nippon Aerosil Co., Ltd. | No hydrophobic treatment |
| N | SP Seal H | Kaleido Corporation | No hydrophobic treatment |

The thickener used in Examples 5, 35 and 36 and Comparisons 11 through 13 of Table 3 was a fatty acid amide thixotropic agent (product name: DISPARLON 6000-10X manufactured by Kusumoto Chemicals, Limited).

The water pressure transfer was performed using the matting activator in these Examples 1 through 36 and Comparisons 1 through 13 by the following methods.

(1) Transfer Film for Imparting Concavo-Convex Design

Figure 10:
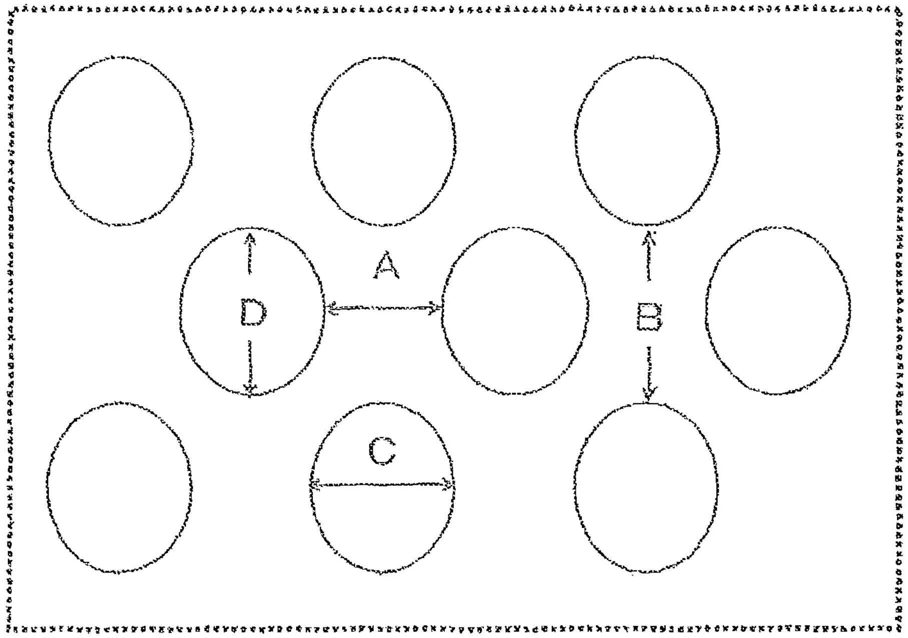
FIG. 10 illustrates in enlarged form the print pattern of the transfer film for imparting concavo-convex design used for the embodiment of the invention and a comparison together with the sizes thereof.

As shown in FIG. 10, the transfer film used had the print pattern comprising the print pattern portion (the first area) studded with the dots of ellipse form and the portion (the second area) having no print pattern between the dots and has been commercially sold by TAICA CORPORATION, the applicant to the licensee of the water pressure transfer art under the brand name called "STAR BACK SI", but the whole outer surface pattern fixture layer or the whole surface ink layer was removed therefrom. Concretely explaining the transfer film called "STAR BACK SI", as shown in FIG. 10, the print pattern had a pearl pigment system ink layer in the circle form of ellipses (the C section (width) of 470 micrometers and the D section (length) 590 micrometer) formed by being alternately aligned at alignment intervals of the A section (length) of 400 micrometers and the B section (width) of 600 micrometers. The ink layer in the form of ellipse circle had a thickness of about 2 micrometers and the water soluble-film had a thickness of about 40 micrometers. Although what is actually sold has the whole outer surface pattern fixture layer of silver pigment ink etc. on the whole surface thereof, the present invention used the transfer film of the state before applying the whole outer surface pattern fixture layer.

(2) The Transfer Film for Gloss Imparting

There were used the transfer films having a single color pattern of each one of yellow, red, blue and black formed by being coated by a bar coater on a PVA (polyvinyl alcohol) film (product name; Hi-Selon E-100), respectively so as to have the film thickness of 3 micrometers. There were used the following inks manufactured by The Intec Co., Ltd. for forming the single color pattern.

Yellow ink: KLCF LIGHTFASTNESS 40 YELLOW (KAI-3)

Red ink: KLCF LIGHTFASTNESS 15 RED (KAI-3)

Blue ink: KLCF 61 BLUE (KAI-3)

Black ink: KLCF 91 BLACK (KAI-3)

(3) Application of the Activator

The activator was applied on the transfer film (1) or (2) by the wire bar coating method so as to have the thickness of 10 micrometers.

(4) Pattern-Transferred Object

There was used a plane board made of ABS resin (TM 20 manufactured by UMG ABS Limited) having the size of 10 cm×20 cm×3 mm used for the object to be pattern-transferred. In case of the transfer film (1) used, the water pressure transfer was performed in order of steps shown in FIG. 9 and in case of the transfer film (2) used, it was performed in order of steps shown in FIG. 2.

There will be described an evaluation method for each item of the evaluation result of Tables 3 through 9 below.

(Efficiency of Coating Operation)

When each activator is applied on the print pattern of the transfer film to the thickness of about 20 micrometers by the wire bar coating method just before introducing the transfer film into the transfer tub, the case where the efficiency of coating operation is good indicates "○" (single circle) for each of the transfer films (1) and (2) while the case where the coating operation is difficult for at least one of the transfer films indicates "X".

(Glossiness)

The gloss value of the water pressure transfer article obtained by using the transfer film (2) was measured according to Z8741-1997 "method 3-60 degree specular surface gloss" using the gross meter (Form HG-268) manufactured by Suga Test Instruments Co., Ltd. The case where the gloss value of all of yellow, red and blue is less than 55 and their arithmetical average value is 20 or less is shown by a symbol "◎" (double circle) (best), the case where the average value is more than 20 to 30 or less is shown by a symbol "○" (single circle) (good), the case where the average value is more than 30 to less than 55 is shown by a symbol "Δ" (triangle) (allowed) and the case where the gloss value of at least one of yellow, red and blue is 55 or more is shown by a symbol "X" (not allowed).

(Concavo-Convex Design)

With respect to the water pressure transfer article obtained by using the transfer film (1), the difference of the height of unevenness of the surface of the decorated article was measured by a laser beam microscope (VK8710 manufactured by KEYENCE CORP.). The range of the difference of the height of less than 6 micrometers is shown by a symbol "○" (Improper), the range of the difference of the height of 6 to less than 1.0 micrometers is shown by a symbol "Δ" (triangle), (allowed), the range of the difference of the height of 10 to less than 20 micrometers is shown by a symbol "○" (single circle) (good) and the range of the difference of the height of more than 20 micrometers is shown by a symbol "◎" (double circle) (best).

(Adhesion)

With respect to the respective water pressure transfer articles obtained by using the transfer films (1) and (2), the adhesion was evaluated by observing the removal state according to a crosscut test (based on Old JIS K5400-8.5) by using "Cellotape" (registered trademark) (manufactured by Nichiban Co., Ltd.). The case where there were not observed the removal of the print layers (surface decoration layer) of any water pressure transfer articles is shown by a symbol "○" (single circle) and the case where there was observed the removal of the print layer of at least one of the water pressure transfer articles is shown by a symbol "X".

Comparing Examples 1 through 36 with Comparisons 1 through 4, even with the amount of addition of the resin beads (the weight ratio of 0.35 or less relative to the ultraviolet ray hardening resin composite) conventionally insufficient for the matting effect, the gross value became remarkably lower (the gloss degree was reduced) by adding the particulate silica (Examples 1 through 4 and 6 through 34) or the thickener (Examples 5, 35 and 36) which are the component for imparting the thixotropy as the resin bead gathering agent within the range of the specific blend ratio, from which it is noted that the matting effect was remarkably improved while maintaining the good efficiency of coating operation and the good adhesion. On the contrary, as shown in the evaluation of Comparisons 7 through 10 in Table 10 and Comparisons 12 and 13 in Table 11, it will be noted that if it fell outside the range of the specific blend ratio, the matting action and the efficiency of coating operation was undesirably worsen. As the resin bead gathering agent and the resin beads were excessively added, the efficiency of coating operation was remarkably worsen even though the resin bead gathering agent was used together, and especially in the case where the resin bead gathering agent was the particulate silica, the tendency was remarkable (see Comparisons 7, 8 and 13).

Although not shown in Tables 3 through 11 even in the case where it was applied so the concavo-convex design film, comparing the matting effect of Example 1 through 36 with that of Comparisons 1 through 13 excluding Comparisons 7 and 8) by visual observation, it is confirmed that the matting effect of Examples 1 through 30 better than that of Comparisons 1 through 13 (excluding Comparisons 7 and 8).

In all Examples, it is confirmed that the highest matting effect could be obtained for the yellow ink, the red ink and the blue ink which were supposed to be generally difficult to obtain the matting effect in comparison with the black ink. In particular, in Examples where the glossy evaluation of is "◎" (double circle) and "○" (single circle), the gloss values of the yellow ink, the red ink and the blue ink are generally equivalent to each other and thus it is confirmed that the high matting effect was obtained with sufficient balance.

It is confirmed that even in Examples 14, 15 and 33 where there was used the ultraviolet ray hardening resin composite of oligomer/monomer system, the same effect was obtained as shown in "Evaluation" in Table 5 and Table 8.

It is confirmed that with the resin beads and the resin bead gathering agent added within the range of the specific blend ratio, the same matting effect was obtained even though the resin beads were made of either of polyethylene, silicone and urethane, as shown in "Evaluation" of Examples 1 through 4 and 6 through 34 in Tables 3 through 8.

Comparing the influences by particle diameter of the resin beads in Examples 22 through 24. Example 23 where the particle diameter was smaller than that of Example 22 had the efficiency of coating operation lower that of Example 22 while Example 24 had no problem of the efficiency of coating operation and the matting effect, but had a roughness occurring on the surface of the decoration layer even though not shown in Table 6. Thus, it will be noted from these results that the particle diameter of the resin beads is preferably in the range of 5-20 micrometers.

In the case where the resin bead gathering agent is particulate silica, the larger the average particle diameter of the particulate silica gets, the smaller the degree of imparting the thixotropy becomes, as noted from Examples 6, 16 and 17 and therefore, the matting effect gets smaller (the gross value gets larger). With the average particle diameter exceeding 10 micrometers as in Example 17, there is seen the tendency for efficiency of coating operation to be also lowered. As noted from the comparison of Examples 7 and 10 where the particulate silica was blended with the resin beads with the same weight ratio of the particulate silica relative to the resin beads and the same particle diameter, with the average particle diameter of particulate silica smaller than 0.01 micrometer (10 nm), there is seen the tendency for the activator to be thickened whereby the efficiency of coating operation was lowered. It will be noted from the results that the particulate silica for the resin bead gathering agent preferably has the average particle diameter ranging from 0.005 to 10 micrometers. All the particulate silica used in Examples 1 through 4, 6 through 25 and 29 through 34 was hydrophobic, but even though it may be hydrophilic silica, the same matting effect can be accomplished, which will be noted from Examples 26 through 28.

Thus, it will be noted that the activator of the invention may be applicable well also to the concavo-convex design which tends to be influenced by the amount of addition of the resin beads. Furthermore, it will be noted from the comparison of the gloss values of Examples 1, 3 and 4 having the surface treatment conditions of particulate silica different from each other that the matting effect will be higher especially with the particulate silica subject to the surface treatment by dimethyldichlorosilane.

Comparing Examples 7 through 11 with Comparison 4, in order to obtain the same matting effect with the resin beads alone, it will be necessary for the amount of addition of the resin bead to be at least twice of the amount of addition of Examples 7 through 11 as shown in Comparison 4, but with the amount of addition of the resin beads increased, although the matting effect is improved, the efficiency of coating operation is worsened and therefore the practicality will be lost. Thus, it will be noted that since the excellent matting effect can be accomplished by a quantity of the resin beads smaller than that of the conventional activator by using the resin bead gathering agent together with the resin beads of the matting agent as in the invention, the efficiency of coating operation and the matting effect are compatible.

Furthermore, it has been found that the matting effect cannot be obtained by the particulate silica alone or the thickener alone as shown in "Evaluation" of Comparisons 5, 6 and 11. Therefore, it is noted that the matting effect which is the problem of the invention will not be attained without collaboration with the resin beads of the matting agent and the particulate silica or the thickener of the resin bead gathering agent.

POSSIBILITY OF UTILIZATION IN INDUSTRIES

The activator of the ultraviolet ray hardening resin composite according to the invention has the matting agent (resin beads) and the resin bead gathering agent (particulate silica, for example) added at a predetermined blend ratio and since the resin bead gathering agent gathers the resin beads to make particle groups, it imparts the big matting effect to the decoration layer without damaging the efficiency of coating operation and therefore the invention has the high utilization in industries.

EXPLANATION OF REFERENCE NUMBER

10 article
20 transfer Film
30 water-soluble film (carrier film)
40 print pattern
40I ink layer
41A the first area
41B the second area
50 water
60 activator
60R surplus part 60BP of the activator
60BP convex part
62 ultraviolet ray hardening resin composite
70 ultraviolet ray
72 shower
74 hot wind

The invention claimed is:

1. A water pressure transfer film comprising an ultraviolet ray hardening resin composite to be applied to a dried print pattern of a water pressure transfer film when said print pattern of said water pressure transfer film having said print pattern dried on a water soluble film is transferred on a surface of an article under water pressure, said ultraviolet ray hardening resin composite including a photo-polymerization component having at least photo-polymerization monomer and a photo-polymerization initiator, serving to reproduce an adhesion of said print pattern by a non-solvent type activating component in said ultraviolet ray hardening resin composite and permeated and intermingled with a whole portion of said print pattern and having a matting agent added to said ultraviolet ray hardening resin composite, characterized in that said matting agent includes resin beads, a matting activator has a resin bead gathering agent added in addition to said matting agent to act on said resin beads of said matting agent to gather every ones of said resin beads to a lump, a weight ratio of blend of said resin beads of said matting agent relative to said ultraviolet ray hardening resin composite is 0.01 to 0.3 and a weight ratio of blend of said resin bead gathering agent relative to said resin beads is adjusted within a range of 0.05 to 1.5 in accordance with the weight ratio of blend of said resin beads.

2. The water pressure transfer film as set forth in claim 1 and characterized in that said resin beads are one or combination of more than two of (polyethylene) beads, urethane beads and silicone beads and a diameter of said resin beads is 5-20 micrometers.

3. The water pressure transfer film as set forth in claim 1 and characterized in that said bead gathering agent is a thixotropic agent.

4. The water pressure transfer film as set forth in claim 3 and characterized in that said thixotropic agent is particulate silica.

5. The water pressure transfer film as set forth in claim 4 and characterized in that said particulate silica is hydrophobic silica and its particle diameter is 0.005-10 micrometers.

6. The water pressure transfer film as set forth in claim 5 and characterized in that said hydrophobic silica takes a silane or silazane surface treatment.

7. A water pressure transfer method in which:

(a) an ultraviolet ray hardening resin composite having a matting agent added to said ultraviolet ray hardening resin composite is applied to a dried print pattern of a water pressure transfer film when said print pattern of said water pressure transfer film having said print pattern dried on a water soluble film is transferred on a surface of an article under water pressure, (b) said ultraviolet ray hardening resin composite including a photo-polymerization component having at least photo-polymerization monomer and a photo-polymerization initiator, serving to reproduce an adhesion of said print pattern by a non-solvent type activating component in said ultraviolet ray hardening resin composite and permeated and intermingled with the whole portion of said print pattern; and thereafter (c) said print pattern of said transfer film being transferred under water pressure to said surface of article and then said ultraviolet ray hardening resin composite permeated said print pattern being hardened by an ultraviolet ray hardening resin composite, characterized in that (d) said matting agent includes resin beads and said activator has a resin bead gathering agent added in addition to said matting agent to act on said resin beads of said matting agent to gather every group of said resin beads to a lump, (e) a weight ratio of blend of said resin beads of said matting agent relative to said ultraviolet ray hardening resin composite is 0.01 to 0.3 and a weight ratio of blend of said resin bead gathering agent relative to said resin beads is adjusted within a range of 0.05 to 1.5 in accordance with the weight ratio of blend of resin beads, (f) wherein said resin beads of said matting agent omnipresent near a surface of said article are gathered by said resin beads gathering agent to form a plurality of bead groups in the form of lump arranged within said decoration layer in a lateral direction of said decoration layer whereby fine unevenness is formed on the surface of said decoration layer opposite said article.

8. A water pressure transfer method as set forth in claim 7 and characterized in that said resin beads are one or combination of more than two of (polyethylene) beads, urethane beads and silicone beads and a diameter of said resin beads is 5-20 micrometers.

9. A water pressure transfer method as set forth in claim 7 and characterized in that said bead gathering agent is a thixotropic agent.

10. A water pressure transfer method as set forth in claim 9 and characterized in that said thixotropic agent is particulate silica.

11. A water pressure transfer method as set forth in claim 10 and characterized in that said particulate silica is hydrophobic silica and its particle diameter is 0.005-10 micrometers.

12. A water pressure transfer article characterized by being formed by the method as set forth in claim 7 and having a decoration layer which has a degree of glossiness of less than 55 measured based on Japanese Industrial Standards Z8741-1997 “method 3-60 degree specular surface gloss”.

13. A water pressure transfer article characterized by being formed by the method as set forth in claim 8 and having a decoration layer which has a degree of glossiness of less than 55 measured based on Japanese Industrial Standards Z8741-1997 “method 3-60 degree specular surface gloss”.

14. A water pressure transfer article characterized by being formed by the method as set forth in claim 9 and having a decoration layer which has a degree of glossiness of less than 55 measured based on Japanese Industrial Standards Z8741-1997 “method 3-60 degree specular surface gloss”.

15. A water pressure transfer article characterized by being formed by the method as set forth in claim 10 and having a decoration layer which has a degree of glossiness of less than 55 measured based on Japanese Industrial Standards Z8741-1997 “method 3-60 degree specular surface gloss”.

16. A water pressure transfer article characterized by being formed by the method as set forth in claim 11 and having a decoration layer which has a degree of glossiness of less than 55 measured based on Japanese Industrial Standards Z8741-1997 “method 3-60 degree specular surface gloss”.

* * * * *